US011082897B2

(12) United States Patent
Luo et al.

(10) Patent No.: US 11,082,897 B2
(45) Date of Patent: Aug. 3, 2021

(54) CONNECTION ESTABLISHMENT METHOD AND APPARATUS

(71) Applicant: HUAWEI TECHNOLOGIES CO., LTD., Guangdong (CN)

(72) Inventors: Haiyan Luo, Shanghai (CN); Hongzhuo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/567,385

(22) Filed: Sep. 11, 2019

(65) Prior Publication Data
US 2020/0008114 A1    Jan. 2, 2020

Related U.S. Application Data

(63) Continuation of application No. PCT/CN2018/080100, filed on Mar. 23, 2018.

(30) Foreign Application Priority Data

Mar. 24, 2017  (CN) .......................... 201710184022.1

(51) Int. Cl.
H04W 36/00  (2009.01)
(52) U.S. Cl.
CPC ... *H04W 36/0069* (2018.08); *H04W 36/0072* (2013.01); *H04W 36/00837* (2018.08)
(58) Field of Classification Search
CPC ....... H04W 36/0069; H04W 36/00837; H04W 36/0072; H04W 76/15; H04W 88/08; H04W 92/20; H04W 76/10
See application file for complete search history.

(56) References Cited

U.S. PATENT DOCUMENTS

2018/0249388 A1    8/2018 Baek et al.
2020/0178326 A1*   6/2020 Sirotkin ................ H04W 76/12

FOREIGN PATENT DOCUMENTS

CN    106162730 A    11/2016
WO    2017034269 A1   3/2017

OTHER PUBLICATIONS

ZTE et al.,"Discussion on the higher layer CU/DU function splits",3GPP TSG RAN WG3 Meeting #95,Athens, Greece, R3-170595, Feb. 13-17, 2017, 7 pages.

(Continued)

Primary Examiner — Thai Nguyen
(74) Attorney, Agent, or Firm — Fish & Richardson P.C.

(57) ABSTRACT

The present disclosure relates to connection establishment methods and apparatus. In one example method, a central unit (CU) function entity receives a first connection establishment request of a master device, where the first connection establishment request includes at least first identification information of a terminal, identification information of a first data radio bearer (DRB), identification information of a target cell, and interface information of the master device. The CU function entity sends a second connection establishment request to a distributed unit (DU) function entity to request the DU function entity to establish a connection to the master device, where the second connection establishment request includes at least second identification information of the terminal, the identification information of the first DRB, and the interface information of the master device.

20 Claims, 9 Drawing Sheets

(56) References Cited

OTHER PUBLICATIONS

ZTE,"Consideration on RRC message transmission",3GPP TSG RAN WG3 Meeting #95 ,Athens, Greece, R3-170586 ,Feb. 13-17, 2017, 4 pages.
Catt et al.,"Considerations on RAN function split between CU and DU",3GPP TSG RAN WG3 Meeting #94,Reno, Nevada, USA,R3-162863, Nov. 14-18, 2016, 5 pages.
PCT International Search Report and Written Opinion in International Application No. PCT/CN2018,080,100, dated May 30, 2018, 13 pages (With English Translation).

\* cited by examiner

CONNECTION ESTABLISHMENT METHOD AND APPARATUS

CROSS-REFERENCE TO RELATED APPLICATIONS

This application is a continuation of International Application No. PCT/CN2018/080100, filed on Mar. 23, 2018, which claims priority to Chinese Patent Application No. 201710184022.1, filed on Mar. 24, 2017. The disclosures of the aforementioned applications are hereby incorporated by reference in their entireties.

TECHNICAL FIELD

This application relates to communications technologies, and in particular, to a connection establishment method and apparatus.

BACKGROUND

In wireless communications technologies, based on a long term evolution (Long Term Evolution, LTE for short) system, a use plane function is improved to support a higher service rate and a greater data throughput.

In the prior art, the improvement is made by splitting data on a radio bearer RB from a master eNB (Master eNB, MeNB for short) to a secondary eNB (Secondary eNB, SeNB for short) and through a bearer for transmission between the MeNB and SeNB and a terminal device UE.

However, when the SeNB adopts a central unit CU-distributed unit DU architecture, split data on an NBR needs to experience an MeNB-to-SeNB transmission delay and a CU-to-DU delay in the SeNB, causing a relatively large data transmission delay.

SUMMARY

Embodiments of this application provide a connection establishment method and apparatus, to reduce a data transmission delay in dual-connectivity or multi-connectivity. The method may be applied to a 5G system, and the 5G system may also be referred to as an NR (new radio, new radio) system.

A first aspect of the embodiments of this application provides a connection establishment method, including the following steps: When a CU function entity receives a first connection establishment request of a master device, the CU function entity sends a second connection establishment request to a DU function entity, where the first connection establishment request includes at least first identification information of a terminal, identification information of a first DRB, identification information of a target cell, and interface information of the master device, the second connection establishment request includes at least second identification information of the terminal, the identification information of the first DRB, and the interface information of the master device, and the DU function entity is associated with the target cell. Then, the CU function entity receives a first response message of the DU function entity, and sends a second response message to the master device, where the first response message includes at least the identification information of the first DRB and interface information of the DU function entity, and the second response message includes at least the identification information of the first DRB and the interface information of the DU function entity. That is, the DU function entity allocates an interface thereon to establish a connection between the master device and the DU function entity, so that a part of data of the master device is directly transmitted to the DU function entity through the connection, and a transmission delay of this part of data can be reduced, thereby reducing a total data transmission delay.

In a possible design, the interface information of the master device includes at least an interface identifier and an interface transmission address of the master device.

In a possible design, the interface information of the DU function entity includes at least an interface identifier and an interface transmission address of the DU function entity.

In a possible design, the second connection establishment request further includes the identification information of the target cell.

In a possible design, in the first connection establishment request, the identification information of the first DRB has a correspondence with the identification information of the target cell.

In a possible design, the first connection establishment request includes identification information of a plurality of cells, and the target cell is one of the plurality of cells.

In a possible design, the first connection establishment request includes measurement information of each of the plurality of cells, and measurement information of the target cell meets a preset condition.

A second aspect of the embodiments of this application provides a connection establishment method, including the following steps: When a central unit CU function entity receives a first connection establishment request of a master device, the CU function entity sends a second response message to the master device, where the first connection establishment request includes at least first identification information of a terminal, identification information of a first DRB, identification information of a target cell, and interface information of the master device, the second response message includes at least the identification information of the first DRB and interface information of a DU function entity, and the DU function entity is associated with the target cell. The CU function entity sends a second connection establishment request to the DU function entity, where the second connection establishment request includes at least the interface information of the DU function entity, second identification information of the terminal, the identification information of the first DRB, and the interface information of the master device. Then, the CU function entity receives a first response message of the DU function entity, where the first response message includes at least the identification information of the first DRB and identification information that is used to indicate whether the DU function entity agrees to establish a connection. That is, the CU function entity allocates an interface to the DU function entity to establish a connection between the master device and the DU function entity, so that a part of data of the master device is directly transmitted to the DU function entity through the connection, and a transmission delay of this part of data can be reduced, thereby reducing a total data transmission delay.

In a possible design, the interface information of the master device includes at least an interface identifier and an interface transmission address of the master device.

In a possible design, the interface information of the DU function entity includes at least an interface identifier and an interface transmission address of the DU function entity.

In a possible design, the second connection establishment request includes the identification information of the target cell.

In a possible design, in the first connection establishment request, the identification information of the first DRB has a correspondence with the identification information of the target cell.

In a possible design, the first connection establishment request includes identification information of a plurality of cells, and the target cell is one of the plurality of cells.

In a possible design, the first connection establishment request includes measurement information of each of the plurality of cells, and measurement information of the target cell meets a preset condition.

A third aspect of the embodiments of this application provides a connection establishment method, including the following steps: When a DU function entity receives a second connection establishment request sent by a CU function entity, the DU function entity sends a first response message to the CU function entity, where the second connection establishment request includes at least second identification information of a terminal, identification information of a first DRB, and interface information of a master device, and the first response message includes at least the identification information of the first DRB and interface information of the DU function entity. That is, the DU function entity allocates an interface thereon to establish a connection between the master device and the DU function entity, so that a part of data of the master device is directly transmitted to the DU function entity through the connection, and a transmission delay of this part of data can be reduced, thereby reducing a total data transmission delay.

In a possible design, the second connection establishment request includes identification information of a target cell, and the target cell is associated with the DU function entity.

A fourth aspect of the embodiments of this application provides a connection establishment apparatus, including:

a receiver, a switch circuit, and a transmitter, where the receiver is configured to receive a first connection establishment request of a master device, where the first connection establishment request includes at least first identification information of a terminal, identification information of a first data radio bearer DRB, identification information of a target cell, and interface information of the master device; the switch circuit is configured to send a second connection establishment request to a distributed unit DU function entity, where the second connection establishment request includes at least second identification information of the terminal, the identification information of the first DRB, and the interface information of the master device, and the DU function entity is associated with the target cell; the switch circuit is configured to receive a first response message of the DU function entity, where the first response message includes at least the identification information of the first DRB and interface information of the DU function entity; and the transmitter is configured to send a second response message to the master device, where the second response message includes at least the identification information of the first DRB and the interface information of the DU function entity.

In a possible design, the interface information of the master device includes at least an interface identifier and an interface transmission address of the master device.

In a possible design, the interface information of the DU function entity includes at least an interface identifier and an interface transmission address of the DU function entity.

In a possible design, the second connection establishment request includes the identification information of the target cell.

In a possible design, in the first connection establishment request, the identification information of the first DRB has a correspondence with the identification information of the target cell.

In a possible design, the first connection establishment request includes identification information of a plurality of cells, and the target cell is one of the plurality of cells.

In a possible design, the first connection establishment request includes measurement information of each of the plurality of cells, and measurement information of the target cell meets a preset condition.

A fifth aspect of the embodiments of this application provides a connection establishment apparatus, including:

a receiver, a switch circuit, and a transmitter, where the receiver is configured to receive a first connection establishment request of a master device, where the first connection establishment request includes at least first identification information of a terminal, identification information of a first data radio bearer DRB, identification information of a target cell, and interface information of the master device; the transmitter is configured to send a second response message to the master device, where the second response message includes at least the identification information of the first DRB and interface information of a distributed unit DU function entity, and the DU function entity is associated with the target cell; the switch circuit is configured to send a second connection establishment request to the DU function entity, where the second connection establishment request includes at least the interface information of the DU function entity, second identification information of the terminal, the identification information of the first DRB, and the interface information of the master device; and the switch circuit is configured to receive a first response message of the DU function entity, where the first response message includes at least the identification information of the first DRB and identification information that is used to indicate whether the DU function entity agrees to establish a connection.

In a possible design, the interface information of the master device includes at least an interface identifier and an interface transmission address of the master device.

In a possible design, the interface information of the DU function entity includes at least an interface identifier and an interface transmission address of the DU function entity.

In a possible design, the second connection establishment request includes the identification information of the target cell.

In a possible design, in the first connection establishment request, the identification information of the first DRB has a correspondence with the identification information of the target cell.

In a possible design, the first connection establishment request includes identification information of a plurality of cells, and the target cell is one of the plurality of cells.

In a possible design, the first connection establishment request includes measurement information of each of the plurality of cells, and measurement information of the target cell meets a preset condition.

A sixth aspect of the embodiments of this application provides a connection establishment apparatus, including:

a switch circuit, where the switch circuit is configured to receive a second connection establishment request sent by a CU function entity, where the second connection establishment request includes at least second identification information of a terminal, identification information of a first DRB, and interface information of a master device, and the switch circuit is configured to send a first response message to the CU function entity, where the first response message includes at least the identification information of the first DRB and interface information of a DU function entity.

In a possible design, the second connection establishment request includes identification information of a target cell, and the target cell is associated with the DU function entity.

BRIEF DESCRIPTION OF DRAWINGS

FIG. 1b is a schematic diagram of a solution of Manner 4 in FIG. 1a;

FIG. 1c is a schematic diagram of a solution of Manner 2 in FIG. 1a;

DESCRIPTION OF EMBODIMENTS

Figure 1A:
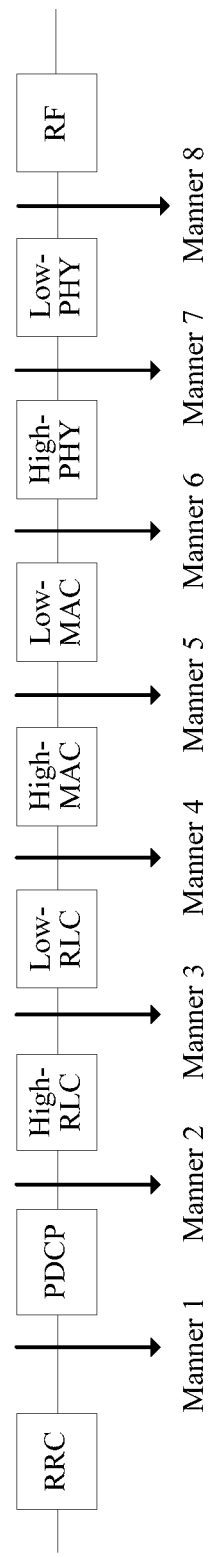
FIG. 1a is a schematic diagram of a possible CU-DU division manner according to an embodiment of this application.

In the specification, claims, and accompanying drawings of the embodiments of this application, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments of this application described herein can be implemented in orders except the order illustrated or described herein. Moreover, the terms "include", "have" and any other variants mean to cover the non-exclusive inclusion, for example, a process, method, system, product, or device that includes a list of steps or units is not necessarily limited to those units, but may include other steps or units not expressly listed or inherent to such a process, method, product, or device.

The embodiments of this application are applied to a multi-connectivity communications system in a central unit (Central Unit, CU for short)-distributed unit (Distributed Unit, DU for short) architecture. Multi-connectivity communication in the CU-DU architecture refers to communication between a terminal and one master device and communication between the terminal and one or more secondary devices, and the secondary device has the CU-DU architecture. In this scenario, that the secondary device has the CU-DU architecture may be understood as that one CU and one DU may be considered as one secondary device. Optionally, a plurality of secondary devices may share one CU. The master device may also have the CU-DU architecture, or may not have the CU-DU architecture. In the embodiments of this application, for ease of description, the master device is specifically a master base station including a CU function entity or including a CU function entity and a DU function entity. The secondary device is specifically a secondary base station including a CU function entity and a DU function entity. In this communications system, all or some of packet data convergence protocol (Packet Data Convergence Protocol, PDCP for short) protocol data units (Protocol Data Unit, PDU for short) generated by the master base station are split to one or more secondary base stations connected to the master base station. In this case, the terminal receives data of a same data radio bearer (Data Radio Bearer, DRB for short) from the master base station and the secondary base station. In this case, the terminal may also send data of a same DRB to the master base station and the secondary base station. In the following, some terms in this application are described, so as to help persons skilled in the art have a better understanding.

(1) A terminal, also referred to as user equipment, is a device providing voice and/or data connectivity to a user, for example, a handheld device or an in-vehicle device having a wireless connection function. Common terminals include, for example, a mobile phone, a tablet computer, a notebook computer, a palmtop computer, a mobile Internet device (mobile internet device, MID for short), and a wearable device, such as a smart watch, a smart band, and a pedometer.

(2) A base station, also referred to as a radio access network (Radio Access Network, RAN for short) device, is a device that connects a terminal to a wireless network. In the embodiments of this application, for ease of distinguishing, a base station in a 4G communications system is referred to as an LTE eNB, a base station in a 5G communications system is referred to as an NR gNB, and a base station supporting both a 4G communications system and a 5G communications system is referred to as an eLTE eNB. In the embodiments of this application, the master base station and the secondary base station may be either of an NR gNB and an eLTE eNB, or may be a base station supporting multi-connectivity in another communication standard.

(3) DRB. In the embodiments of this application, a bearer between a core network and a terminal is collectively referred to as an evolved packet system (Evolved Packet System, EPS for short) bearer. The EPS bearer is divided into two segments. A bearer between the core network and a base station is referred to as an S1 bearer, and a bearer between the base station and the terminal is referred to as a DRB. The EPS bearer, the S1 bearer, and the DRB are in a one-to-one correspondence. A PDU session set up between the core network and the base station includes one or more quality of service (Quality of Service, QoS for short) flows. Different QoS flows have different QoS requirements. After the QoS flows arrive at the base station, the base station may map the one or more QoS flows to one DRB.

(4) CU function entity. In this application, for ease of description, a function entity supporting a higher layer protocol stack of a base station is referred to as a CU function entity, and its name is not uniquely limited. Actually, the function entity may be given any name in an actual application.

(5) DU function entity. In this application, for ease of description, a function entity supporting an underlying protocol stack of a base station is referred to as a DU function entity, and its name is not uniquely limited. Actually, the function entity may be given any name in an actual application. It should be noted that in the embodiments of this application, one CU function entity may correspond to one DU function entity, or one CU function entity may correspond to a plurality of DU function entities. One DU function entity may correspond to one cell, or one DU function entity may correspond to a plurality of cells.

In addition, in the embodiments of this application, for ease of description, Xn is used to represent an interface between the master base station and the secondary base station, and Xx is used to represent an interface between the CU function entity and the DU function entity. However, Xn and Xx do not uniquely limit the foregoing interfaces.

Figure 1B:
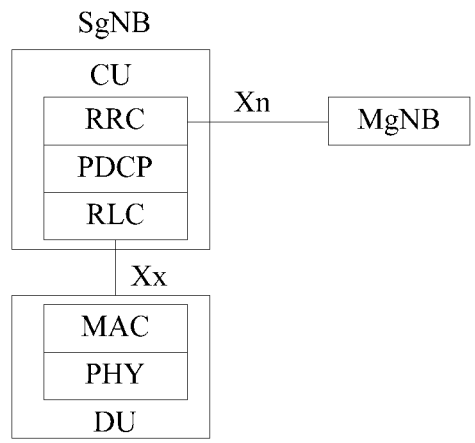
Figure 1C:
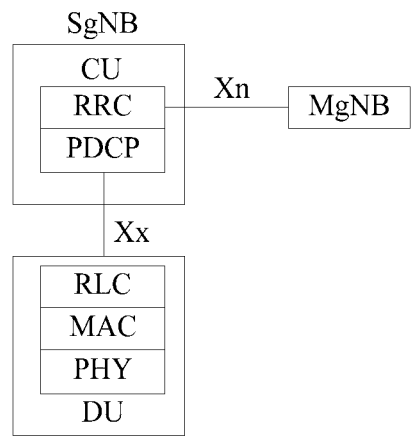

In a base station in a 5G communications system, there may be a plurality of division manners of the CU function entity and the DU function entity. FIG. 1a is a schematic diagram of a possible CU-DU division manner according to an embodiment of this application. In FIG. 1a, an NR gNB includes a radio resource control (Radio Resource Control, RRC for short) layer, a PDCP layer, a radio link control (Radio Link Control, RLC for short) layer, a media access control (Medium Access Control, MAC for short) layer, a physical layer (Physical Layer, PHY for short), and a radio frequency (Radio Frequency, RF for short) unit. In FIG. 1a, a location of each arrow indicates a possible division manner. A left side of the arrow in each division manner is a CU function entity part, and a right side of the arrow is a DU function entity part. Particularly, FIG. 1b is a schematic diagram of a solution of Manner 4 in FIG. 1a, and FIG. 1c is a schematic diagram of a solution of Manner 2 in FIG. 1a. In FIG. 1b and FIG. 1c, a master base station and a secondary base station are specifically base stations in the 5G communications system, and are denoted as an MgNB and an SgNB respectively. In the solution shown in FIG. 1b, a CU function entity of the SgNB includes an RRC layer, a PDCP layer, and an RLC layer, and a DU function entity includes a MAC layer and a PHY layer. In the solution shown in FIG. 1c, a CU function entity of the SgNB includes an RRC layer and a PDCP layer, and a DU function entity includes an RLC layer, a MAC layer, and a PHY layer. As shown in FIG. 1b and FIG. 1c, in the prior art, no matter how the CU function entity and the DU function entity are divided, the MgNB directly establishes a connection to the CU function entity of the SgNB. Split data of the MgNB is first sent to the CU function entity of the SgNB, then sent by the CU function entity of the SgNB to the DU function entity of the SgNB, and finally, sent by the physical layer of the DU function entity of the SgNB to a terminal. That is, how the CU function entity and the DU function entity are divided on an SgNB side, split data sent by the MgNB to the SgNB experience both a transmission delay of an Xn interface and a transmission delay of an Xx interface, and has a relatively large data transmission delay.

Figure 2:
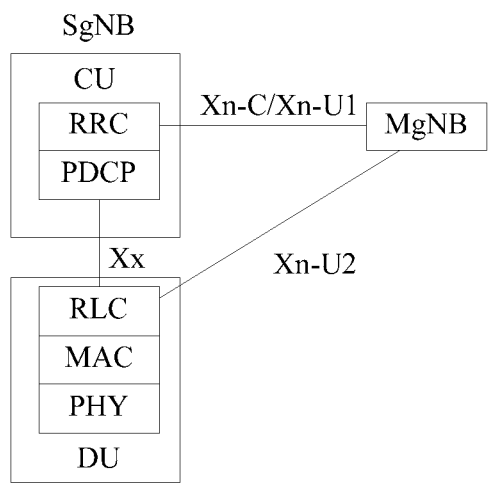
FIG. 2 is a schematic diagram of a solution according to an embodiment of this application.

For the foregoing problem, FIG. 2 is a schematic diagram of a solution according to an embodiment of this application. In FIG. 2, a CU function entity of an SgNB includes RRC and PDCP, and a DU function entity includes RLC, MAC, and PHY. Herein, it should be noted that, a division manner of the CU function entity and the DU function entity shown in FIG. 2 is merely a division manner used as an example, rather than a specific limitation thereon. Actually, the solution provided in this embodiment of this application is applicable to any possible division manner of the CU function entity and the DU function entity. In the solution shown in FIG. 2, an MgNB not only establishes a first connection to the CU function entity of the SgNB, but also establishes a second connection to the DU function entity of the SgNB. The first connection is used to transmit control plane data Xn-C and a part of Xn-U1 that is in user plane data and that is used to support data forwarding during switching. The second connection is used to transmit a part of Xn-U2 in a PDCP PDU in a user plane. Because the part of Xn-U2 in the user plane is directly sent by the MgNB to the DU function entity of the SgNB, data of this part does not need to experience a transmission delay of an Xx interface, thereby reducing a total data transmission delay.

For the solution shown in FIG. 2, this application provides several embodiments below. The following describes the embodiments with reference to specific scenarios.

Figure 3:
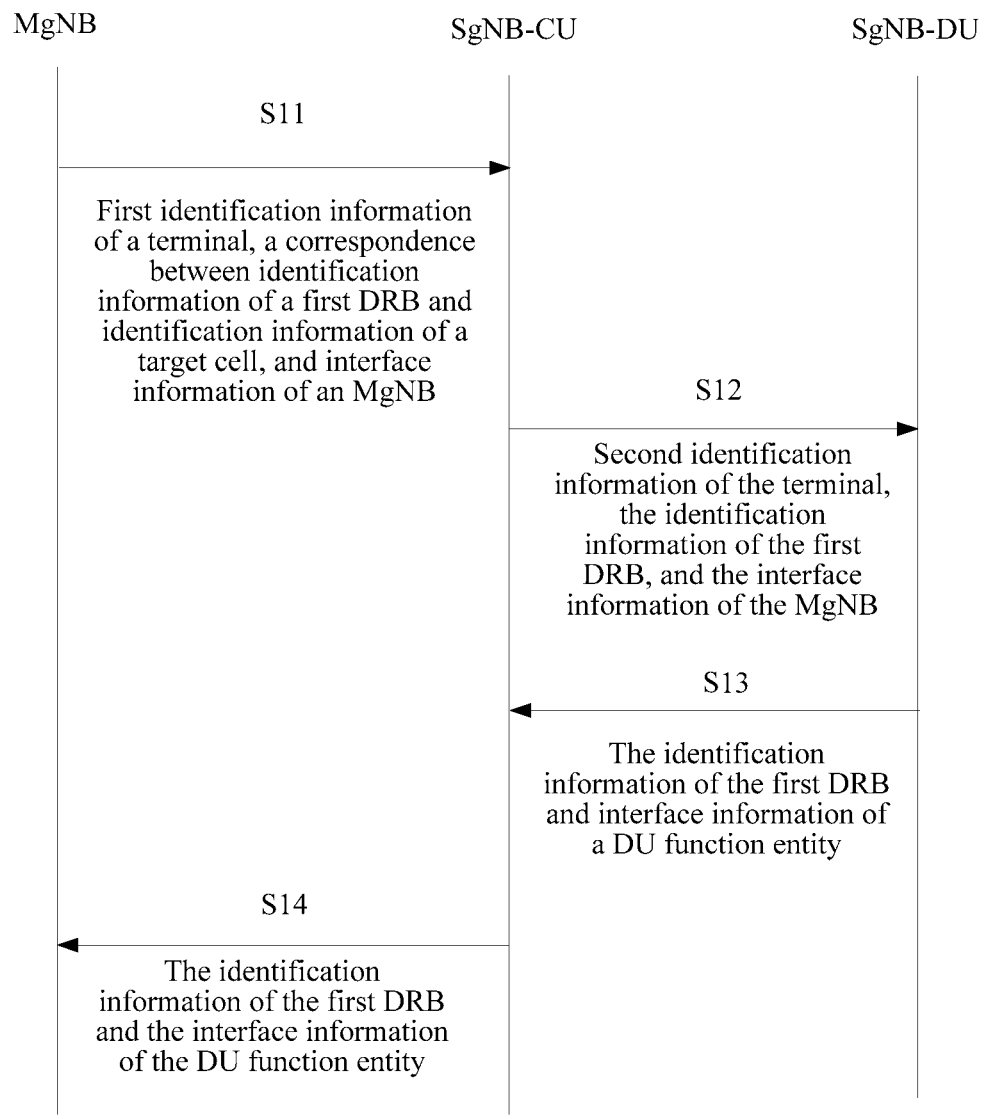
FIG. 3 is a schematic diagram of a scenario according to an embodiment of this application.

FIG. 3 is a schematic diagram of a scenario according to an embodiment of this application. As shown in FIG. 3, signaling interaction between a master base station MgNB, a secondary base station-CU function entity SgNB-CU, and a secondary base station-DU function entity SgNB-DU includes S11-S14.

S11. The MgNB sends a first connection establishment request to the SgNB-CU.

A name definition of the "first connection establishment request" is only for ease of distinguishing, and does not have a limitative meaning. For example, the "first connection establishment request" may also be named as a tunnel setup request, a session setup request, or a bearer setup request. The first connection establishment request is used to request an SgNB to establish a connection between the SgNB-DU and the MgNB, so that the MgNB can directly split data to the SgNB-DU.

Figure 4:
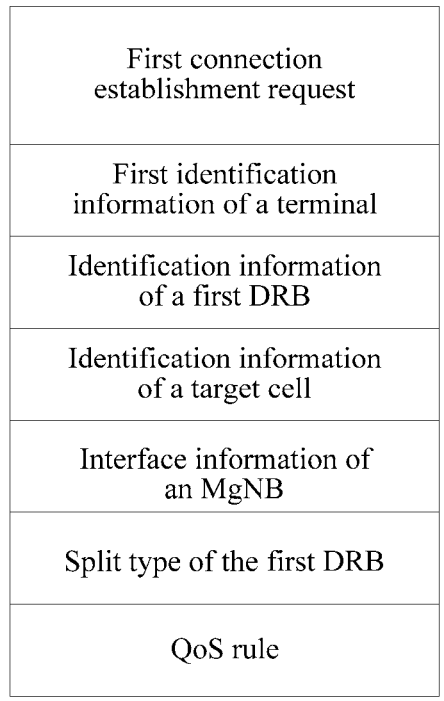
FIG. 4 is a schematic diagram of signaling content of a first connection establishment request according to an embodiment of this application.

FIG. 4 is a schematic diagram of signaling content of a first connection establishment request according to an embodiment of this application. As shown in FIG. 4, the first connection establishment request in this embodiment includes first identification information of a terminal, identification information of a first DRB, identification information of a target cell, and interface information of an MgNB. Optionally, the first connection establishment request may further include information such as a split type of the first DRB and a QoS rule. The QoS rule includes a data packet filter rule (packet filter), a precedence order (precedence order), QoS characteristics (QoS characteristics), a QoS marking (QoS marking), and the like. The QoS characteristics may include uplink and downlink maximum flow bit rates (UL and DL maximum flow bit rate), uplink and downlink guaranteed flow bit rates (UL and DL guaranteed flow bit rate), a priority level (priority level), a packet delay budget (packet delay budget), a packet error rate (packet error rate), an allocation and retention priority (Allocation and Retention Priority, ARP for short), notification control (Notification Control), and the like. The split type mainly includes but is not limited to a split bearer (split bearer) type, and the split type and a DRB may be in a one-to-one correspondence or a one-to-multiple correspondence. In other words, in this embodiment, the first connection establishment request may be expressed, as an example, as including at least the first identification information of the terminal, the identification information of the target cell, and the interface information of the MgNB. The interface information of the MgNB includes an interface identifier and an interface transmission address of the MgNB. The interface identifier is used to represent an identifier of an interface of a to-be-established connection on an MgNB side, and the interface transmission address is used to represent a transmission address of the interface of the to-be-established connection on the MgNB side. The target cell is used to represent a cell in which the SgNB-DU is located. The first DRB is used to represent a DRB to be split on the MgNB side.

In addition, in this embodiment, the MgNB determines a target cell that is within coverage of the SgNB and that corresponds to the first DRB. In this case, in the first connection establishment request, the MgNB needs to provide a correspondence between the first DRB and the target cell. In other words, this may be expressed as an example as: in the first connection establishment request, the identification information of the first DRB has a correspondence with the identification information of the target cell. For example, before sending the first connection establishment request, the MgNB sends measurement control information to the terminal, and after the terminal feeds back measurement information, the MgNB selects, based on the information fed back by the terminal, a cell whose measurement result meets a preset condition as the target cell. The preset condition may be specifically set based on a specific requirement, and is not limited herein.

S12. The SgNB-CU sends a second connection establishment request to the SgNB-DU.

In an actual scenario, the target cell may include only one DU function entity, or may include a plurality of DU function entities.

Figure 5:
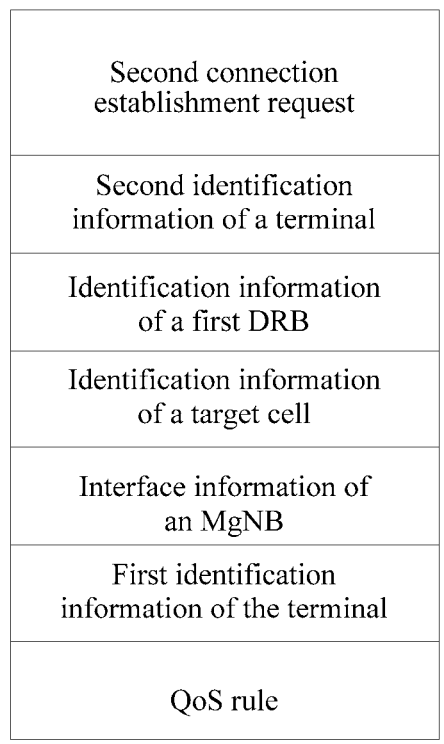
FIG. 5 is a schematic diagram of signaling content of a second connection establishment request according to an embodiment of this application.

When the target cell corresponds to only one DU function entity, the SgNB-CU considers that the DU function entity is the SgNB-DU by default. When the target cell corresponds to a plurality of DU function entities, the SgNB-CU may select one DU function entity from the plurality of DU function entities based on other information (for example, DU load, an access user quantity, and resource usage) stored by the SgNB or provided by the different DU function entities within coverage of the target cell. After determining that the DU function entity is the SgNB-DU, the SgNB-CU sends the second connection establishment request to the SgNB-DU. Herein, a name of "the second connection establishment request" is merely for distinguishing from the "first connection establishment request", and does not have a limitative meaning. The second connection establishment request is used to request the SgNB-DU to allocate interface information of a to-be-established connection on a DU function entity side, and establish a connection to the MgNB. FIG. 5 is a schematic diagram of signaling content of a second connection establishment request according to an embodiment of this application. As shown in FIG. 5, the second connection establishment request in this embodiment includes second identification information of the terminal, the identification information of the first DRB, and the interface information of the master base station; and optionally, may further include a QoS rule, the first identification information of the terminal, the identification information of the target cell, and the like. In other words, the second connection establishment request may be expressed, as an example, as including at least the second identification information of the terminal, the identification information of the first DRB, and the interface information of the master base station. In the foregoing description, the interface information of the DU function entity side may be expressed, as an example, as interface information of the DU function entity, which includes an interface identifier and an interface transmission address of the DU function entity.

Herein, it should be noted that, in an actual scenario, there may be a plurality of cells within coverage of one DU function entity. Therefore, in this case, the SgNB-CU needs to add the identification information of the target cell to the second connection establishment request and send the request to the SgNB-DU, so that the SgNB-DU determines a cell that is within coverage of the SgNB-DU and to which data of the first DRB is split.

In addition, in this embodiment, there may be two relationships between the second identification information of the terminal and the first identification information of the terminal:

In a possible relationship, the second identification information of the terminal is the same as the first identification information of the terminal, which may be, for example, an international mobile subscriber identity (International Mobile Subscriber Identification Number, IMSI for short) or an international mobile equipment identity (International Mobile Equipment Identity, IMEI for short).

In another possible relationship, the second identification information of the terminal is different from the first identification information of the terminal. For example, the first identification information of the terminal may be specifically an interface identifier of the terminal on the MgNB side (for example, which may usually be named as MgNB terminal XnAPID), and the second identification information of the terminal may be specifically an interface identifier of the terminal on an SgNB side (for example, which may usually be named as SgNB terminal XnAPID). In this case, the SgNB-CU needs to determine the second identification information of the terminal on the SgNB based on the first identification information of the terminal that is included in the first connection establishment request.

However, regardless of the relationship between the second identification information of the terminal and the first identification information of the terminal, both the second identification information of the terminal and the first identification information of the terminal are used to indicate a target terminal to which split data is to be sent.

S13. The SgNB-DU sends a first response message to the SgNB-CU.

In this embodiment, after receiving the second connection establishment request, the SgNB-DU needs to determine whether the SgNB-DU needs to allocate information about an interface connected to the DU function entity side. There may be a plurality of determining manners for the SgNB-DU. Several possible manners are enumerated below, but the determining manner is not limited thereto.

In a possible manner, determining is performed based on different specific names of the second connection establishment request. For example, when the SgNB-DU does not need to perform allocation, the name of the second connection establishment request may be specifically a DU adding message. When the SgNB-DU needs to perform allocation, the name of the second connection establishment request may be specifically a DU multi-connection adding message. Certainly, a description is provided herein only as an example, and does not have a limitative meaning.

In another possible manner, the specific name of the second connection establishment request is unchanged. When the SgNB-DU needs to allocate the interface information of the to-be-established connection on the DU function entity side, the second connection establishment request carries preset identification information, and the identification information is used to indicate that the SgNB-DU needs to allocate the interface information of the DU function entity side. When the SgNB-DU does not need to perform allocation, the second connection establishment request does not carry the identification information.

In still another possible manner, the specific name of the second connection establishment request is unchanged. The SgNB-DU performs determining based only on whether the second connection establishment request carries the interface information of the DU function entity side. For example, when the second connection establishment request includes the interface information of the DU function entity side, the SgNB-DU determines that the SgNB-DU does not need to allocate the interface information of the DU function entity side. When the second connection establishment request does not include the interface information of the DU function entity side, the SgNB-DU determines that the SgNB-DU needs to allocate the interface information of the DU function entity side.

It should be noted that a solution in which the SgNB-DU allocates the interface information of the DU function entity side is adopted in this embodiment. In this solution, the SgNB-DU establishes a connection to the MgNB based on the interface information of the MgNB and the interface information of the DU function entity side that is allocated by the SgNB-DU. The connection is a connection used to split data on the first DRB.

After this or at the same time, the SgNB-DU sends the first response message to the SgNB-CU. The first response message includes the identification information of the first DRB, and the interface information of the DU function entity side that is allocated by the SgNB-DU. Optionally, the first response message may further include the first identification information of the terminal, the second identification information of the terminal, and the like. In other words, the first response message may be expressed, as an example, as including at least the identification information of the first DRB and the interface information of the DU function entity.

S14. The SgNB-CU sends a second response message to the MgNB.

The second response message includes the identification information of the first DRB and the interface information of the DU function entity. Optionally, the second response message may further include the first identification information of the terminal and the second identification information of the terminal. In other words, the second response message may be expressed, as an example, as including at least the identification information of the first DRB and the interface information of the DU function entity.

In this embodiment, the first identification information of the terminal, the identification information of the first DRB, the identification information of the target cell, and the interface information of the MgNB are added to the first connection establishment request sent by the MgNB, so that after the SgNB-CU determines the SgNB-DU within the coverage of the target cell, the SgNB-CU adds the second identification information of the terminal, the identification information of the first DRB, and the interface information of the MgNB to the second connection establishment request and sends the request to the SgNB-DU. Therefore, the SgNB-DU allocates the interface information of the to-be-established connection on the DU function entity side based on the second connection establishment request, and establishes the connection to the MgNB. In this way, the master base station MgNB can directly split a part of the data on the first DRB to the SgNB-DU through the connection without experiencing a transmission delay between the SgNB-CU and the SgNB-DU, thereby reducing a total data transmission delay.

Figure 6:
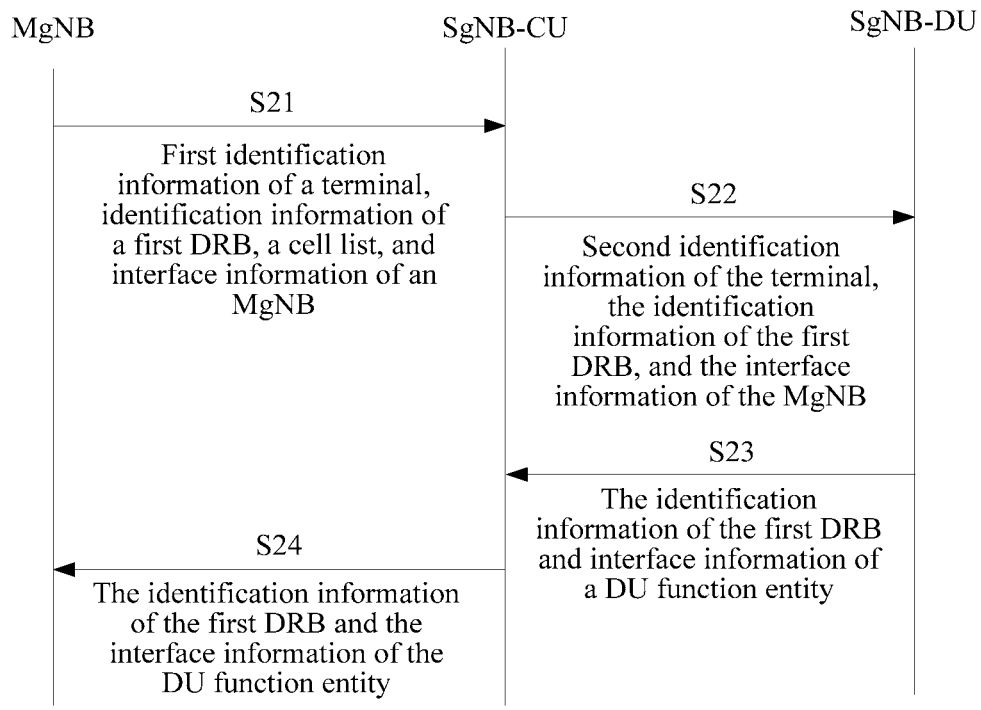
FIG. 6 is a schematic diagram of a scenario according to an embodiment of this application.

FIG. 6 is a schematic diagram of a scenario according to an embodiment of this application. As shown in FIG. 6, signaling interaction between a master base station MgNB, a secondary base station-CU function entity SgNB-CU, and a secondary base station-DU function entity SgNB-DU includes S21 to S24. Execution manners and beneficial effects of S22 to S24 are similar to those of S12 to S14 in the scenario of FIG. 3, and details are not described herein again.

Figure 7:
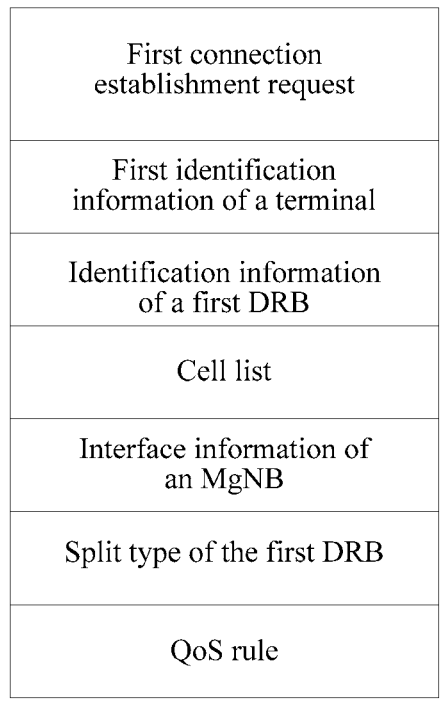
FIG. 7 is a schematic diagram of signaling content of a first connection establishment request according to an embodiment of this application.

FIG. 7 is a schematic diagram of signaling content of a first connection establishment request according to an embodiment of this application. As shown in FIG. 7, a difference between S21 in this embodiment and S11 in the scenario of FIG. 3 lies in that the first connection establishment request includes a cell list. The cell list stores identification information of a plurality of cells, and the target cell in S11 is one of the plurality of cells in the cell list.

In addition, in the first connection establishment request, there is no correspondence between identification information of a first DRB and identification information of a target cell. Instead, the cell list carries measurement information corresponding to each cell. In this scenario, before sending the first connection establishment request, the MgNB first sends cell measurement control information to a terminal, then forms the cell list based on cell identification information returned by the terminal and a measurement result corresponding to the cell identification information, and adds the cell list to the first connection establishment request and sends the request to the SgNB-CU. The measurement result involved herein may include one or more of reference signal received quality, reference signal received power, channel state information, and beam (beam) information.

Herein, it should be noted that, in an actual application, the cell list in this embodiment may not only include the cell identification information and the cell measurement information, but also further include other information, for example, cell access information. The cell access information may be, for example, one or more of an identifier of the terminal on a radio access network side, a preamble (Preamble) sequence number, and information about accessed time-frequency domain.

In this scenario, the SgNB-CU needs to select a cell from the cell list as a target cell corresponding to the first DRB. A selection policy may be: using a cell whose corresponding measurement result meets a preset condition as the target cell. In other words, the foregoing description of selecting the target cell may be expressed, as an example, as that measurement information of the target cell meets the preset condition. For example, the target cell is a cell whose signal strength is the highest in the cell list. Certainly, a description is provided here only as an example, rather than a specific limitation on this application. Actually, in an actual application, the preset condition is not fixed and may be specifically configured based on a specific requirement.

In this embodiment, the SgNB-CU selects the target cell from the cell list carried in the first connection establishment request, and after selecting the SgNB-DU within coverage of the target cell, adds second identification information of the terminal, the identification information of the first DRB, and interface information of the MgNB to a second connection establishment request and sends the request to the SgNB-DU, so that the SgNB-DU allocates interface information of a to-be-established connection on a DU function entity side based on the second connection establishment request, and establishes a connection to the MgNB. In this way, the master base station MgNB can directly split a part of data on the first DRB to the SgNB-DU through the connection without experiencing a transmission delay between the SgNB-CU and the SgNB-DU, thereby reducing a total data transmission delay.

Figure 8:
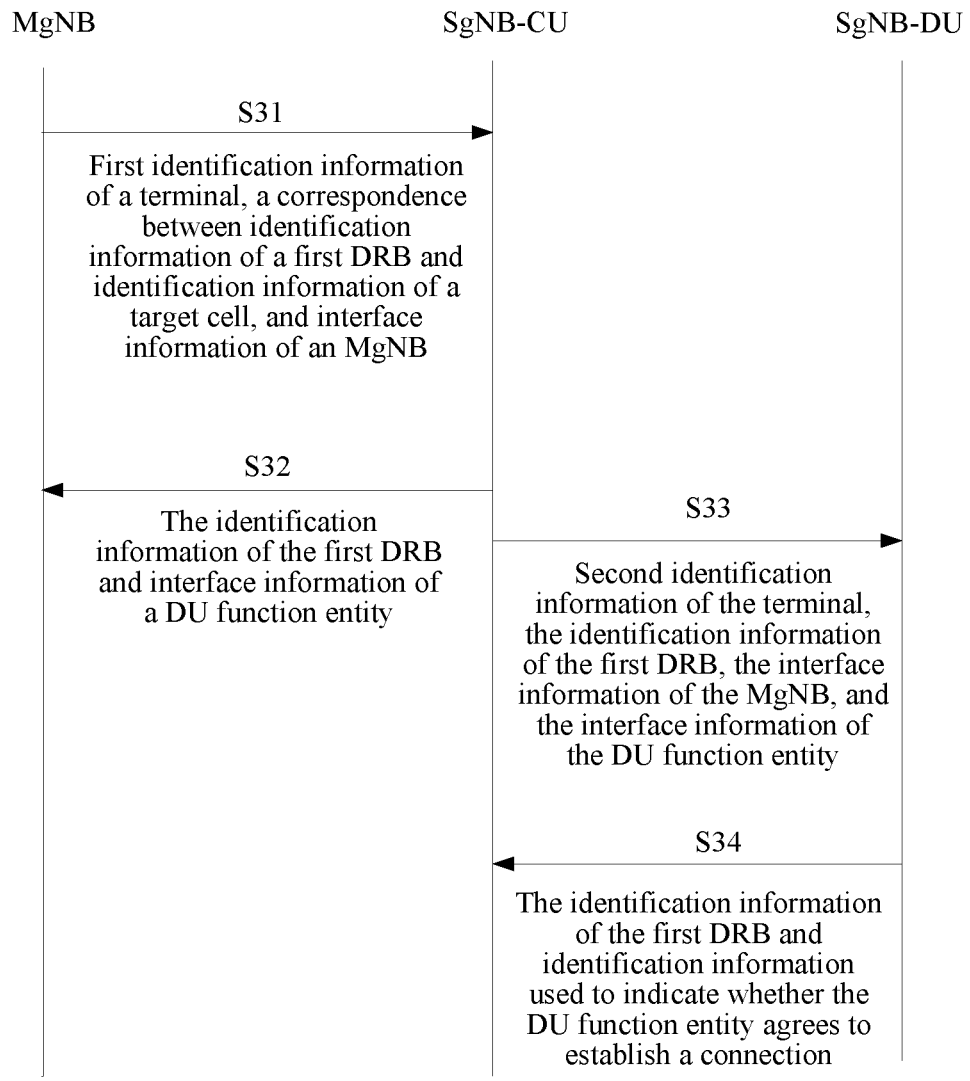
FIG. 8 is a schematic diagram of a scenario according to an embodiment of this application.

FIG. 8 is a schematic diagram of a scenario according to an embodiment of this application. As shown in FIG. 8, signaling interaction between a master base station MgNB, a secondary base station-CU function entity SgNB-CU, and a secondary base station-DU function entity SgNB-DU includes S31-S34.

S31. The MgNB sends a first connection establishment request to the SgNB-CU.

An execution manner and a beneficial effect of S31 in this embodiment are the same as those of S11 in the scenario of FIG. 3, and details are not described herein again.

S32. The SgNB-CU sends a second response message to the MgNB.

A difference between this embodiment and the scenario shown in FIG. 3 lies in that, in the scenario shown in FIG. 3, the interface information of the to-be-established connection on the SgNB side (that is, the interface information of the DU function entity) is allocated by the SgNB-DU, and in this embodiment, interface information of the SgNB side is allocated by the SgNB-CU.

In the scenario of this embodiment, after receiving the first connection request sent by the MgNB, the SgNB-CU adds, to the second response message, the interface information of the SgNB side (namely, interface information of the DU function entity) that is allocated by the SgNB-CU in S32, and sends the message to the MgNB. The second response message involved herein includes same content as the second response message in the embodiment of FIG. 3, and optional content may be different.

S33. The SgNB-CU sends a second connection establishment request to the SgNB-DU.

Because the interface information of the SgNB side in this embodiment is allocated by the SgNB-CU, in this embodiment, a difference between S33 and S12 in FIG. 3 lies in that: in addition to the content of the second connection establishment request in S12, content necessarily included in the second connection establishment request in S33 further includes the interface information of the SgNB side (namely, the interface information of the DU function entity) that is allocated by the SgNB-CU. In other words, the second connection establishment request in this embodiment may be expressed, as an example, as including at least the interface information of the DU function entity, second identification information of a terminal, identification information of a first DRB, and interface information of the master base station.

S34. The SgNB-DU sends a first response message to the SgNB-CU.

A difference between the first response message in S34 in this embodiment and the first response message in S13 in FIG. 3 lies in that: because the interface information of the SgNB side in this embodiment is allocated by the SgNB-CU, the first response message in S34 does not include the interface information of the DU function entity, but includes identification information used to indicate whether the DU function entity agrees to establish a connection. Apart from this, the first response message in S34 is the same as the first response message in S13. In other words, in this embodiment, the first response message may be expressed, as an example, as including at least the identification information of the first DRB and the first response message.

In this embodiment, after the MgNB sends the first connection establishment request to the SgNB-CU, the SgNB-CU allocates the interface information of the DU function entity of the to-be-established connection on the SgNB side, and the SgNB-DU establishes a connection to the MgNB based on the interface information of the DU function entity that is allocated by the SgNB-CU, and the interface information of the MgNB. In this way, the master base station MgNB can directly split a part of data on the first DRB to the SgNB-DU through the connection without experiencing a transmission delay between the SgNB-CU and the SgNB-DU, thereby reducing a total data transmission delay.

Figure 9:
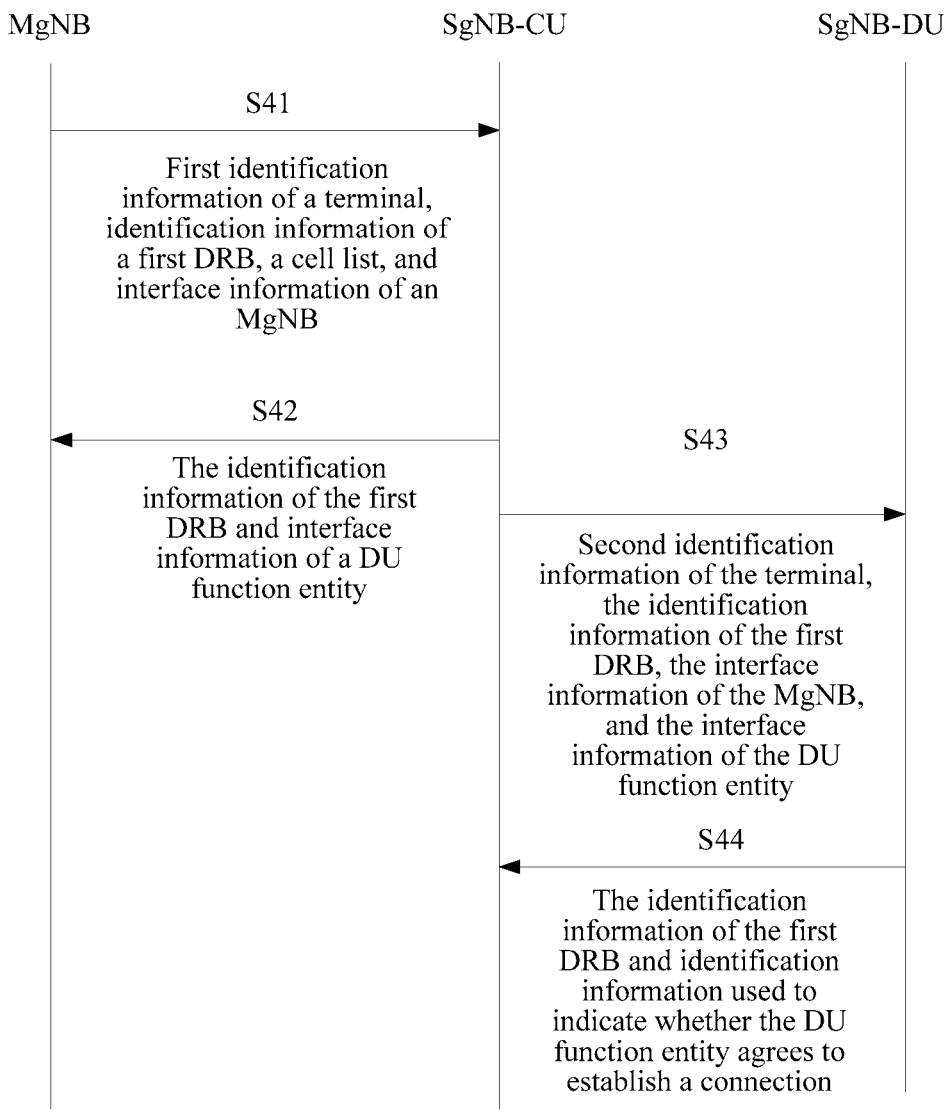
FIG. 9 is a schematic diagram of a scenario according to an embodiment of this application.

FIG. 9 is a schematic diagram of a scenario according to an embodiment of this application. As shown in FIG. 9, signaling interaction between a master base station MgNB, a secondary base station-CU function entity SgNB-CU, and a secondary base station-DU function entity SgNB-DU includes S41-S44. Execution manners and beneficial effects of S42 to S44 are similar to those of S32 to S34 in the scenario of FIG. 8, and details are not described herein again.

A difference between S41 in this embodiment and S31 in the scenario of FIG. 8 lies in that a first connection establishment request includes a cell list. The cell list stores identification information of a plurality of cells, and the target cell in S31 is one of the plurality of cells in the cell list.

In addition, in the first connection establishment request, there is no correspondence between identification information of a first DRB and identification information of a target cell. Instead, the cell list carries measurement information corresponding to each cell. For example, before sending the first connection establishment request, the MgNB first sends cell measurement control information to a terminal, then forms the cell list based on cell identification information returned by the terminal and a measurement result corresponding to the cell identification information, and adds the cell list to the first connection establishment request and sends the request to the SgNB-CU. Herein, it should be noted that, in an actual application, the cell list in this embodiment may not only include the cell identification information and the cell measurement information, but also further include other information, for example, cell access information. The cell access information may include, for example, an identifier of the terminal on a radio access network side, a preamble (Preamble) sequence number, and information about accessed time-frequency domain.

In this scenario, the SgNB-CU needs to select a cell from the cell list as a target cell corresponding to the first DRB. A selection policy may be: using a cell whose corresponding measurement result meets a preset condition as the target cell. In other words, the foregoing description of selecting the target cell may be expressed, as an example, as that measurement information of the target cell meets the preset condition. For example, the target cell is a cell whose signal strength is the highest in the cell list. Certainly, a description is provided here only as an example, rather than a specific limitation on this application. Actually, in an actual application, the preset condition is not fixed and may be specifically configured based on a specific requirement.

In this embodiment, the SgNB-CU selects the target cell from the cell list carried in the first connection establishment request, and adds second identification information of the terminal, the identification information of the first DRB, interface information of the MgNB, and interface information of a DU function entity side that is allocated by the SgNB-CU, to a second connection establishment request and sends the request to the SgNB-DU, so that the SgNB-DU establishes a connection to the MgNB. In this way, the master base station MgNB can directly split a part of data on the first DRB to the SgNB-DU through the connection without experiencing a transmission delay between the SgNB-CU and the SgNB-DU, thereby reducing a total data transmission delay.

Figure 10:
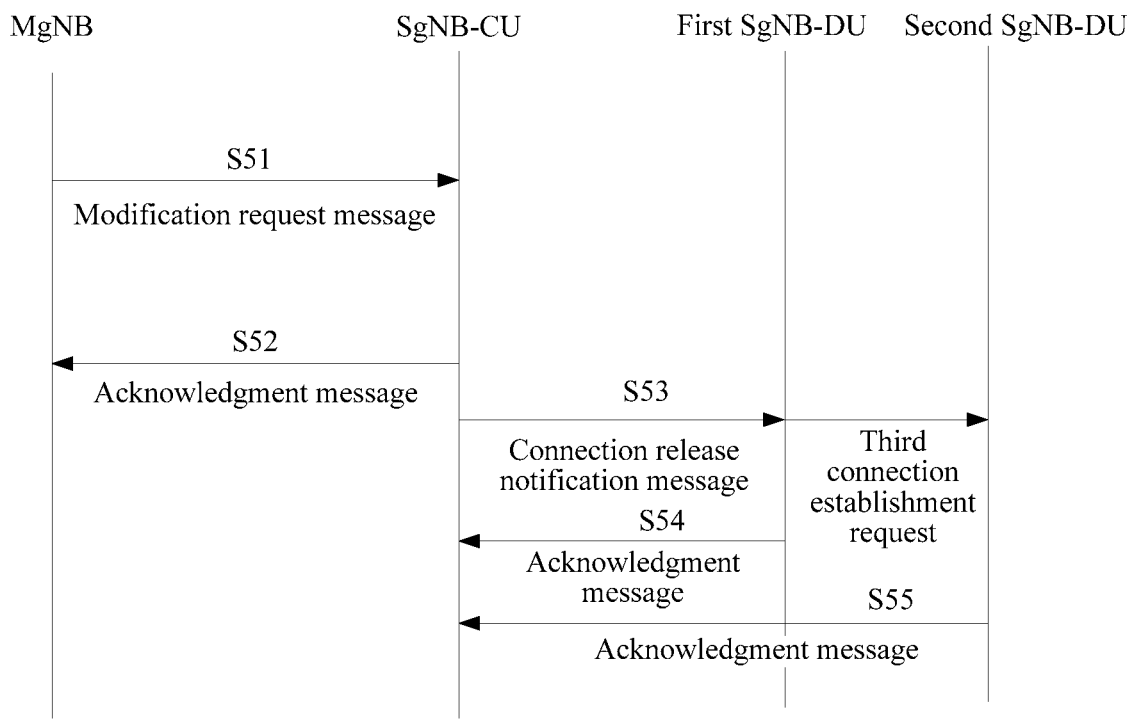
FIG. 10 is a schematic diagram of a scenario according to an embodiment of this application.

FIG. 10 is a schematic diagram of a scenario according to an embodiment of this application. In this scenario, an MgNB decides to change the connection established in any one of the scenarios in FIG. 3 to FIG. 9. It is assumed that an SgNB-DU that has established a connection to the MgNB is referred to as a first SgNB-DU, and an SgNB-DU that is to establish a connection to the MgNB is referred to as a second SgNB-DU. As shown in FIG. 10, signaling interaction between the master base station MgNB, a secondary base station-CU function entity SgNB-CU, the first SgNB-DU, and the second SgNB-DU includes S51 to S54.

S51. The MgNB sends a modification request message to the SgNB-CU.

In an actual application, there may be the following cases in which the MgNB changes a current connection:

In a possible case, the MgNB decides to change interface information of the current connection on an MgNB side. In this case, the modification request message includes at least identification information of a first DRB and changed interface information of the MgNB side. Optionally, the modification request message may further include an interface identifier of a terminal on the MgNB side and an interface identifier of the terminal on an SgNB side.

In a possible case, the MgNB decides to change a target cell on an SgNB side. In this case, before sending the modification request message, the MgNB needs to first receive cell measurement information of the SgNB side that is sent by a terminal or load information sent by the SgNB side, and re-select a target cell based on the information. After selecting the target cell, the MgNB adds at least identification information of a first DRB and identification information of the re-selected target cell to the modification request message and sends the message to the SgNB-CU. Optionally, the MgNB may further add an interface identifier of the terminal on an MgNB side and an interface identifier of the terminal on the SgNB side to the modification request message and send the message to the SgNB-CU.

S52. The SgNB-CU sends an acknowledgment message of the modification request to the MgNB.

For the first possible case in S51, the acknowledgment message includes at least information used to indicate whether to accept a modification, and the identification information of the first DRB. Optionally, the acknowledgment message may further include the interface identifier of the terminal on the MgNB side and the interface identifier of the terminal on the SgNB side.

For the second possible case in S51, the acknowledgment message includes at least the identification information of the first DRB and interface information of a DU function entity in the re-selected target cell. Optionally, the acknowledgment message may further include the interface identifier of the terminal on the MgNB side, the interface identifier of the terminal on the SgNB side, and access information of the re-selected target cell.

Herein, it should be noted that the interface information of the DU function entity in this embodiment may be allocated by the SgNB-CU, or may be allocated by the second SgNB-DU in the re-selected target cell. Execution methods of different allocation manners are similar to the foregoing embodiments, and details are not described herein again.

S53. The SgNB-CU sends a connection release notification message to the first SgNB-DU, and sends a third connection establishment request to the second SgNB-DU.

The first SgNB-DU and the second SgNB-DU may be a same DU function entity, or may be different function entities.

When the first SgNB-DU and the second SgNB-DU are a same DU function entity, that is, when the re-selected target cell and an original target cell belong to one DU function entity, the notification message and the third connection establishment request may be used as independent messages, and simultaneously or successively sent to the DU function entity; or the notification message and the third connection establishment request may be combined into a new request message and sent to the DU function entity.

When the first SgNB-DU and the second SgNB-DU are not a same DU function entity, the notification message and the third connection establishment message are sent to the first SgNB-DU and the second SgNB-DU respectively.

The notification message is used to instruct the first SgNB-DU to release a connection corresponding to a current first DRB, and the notification message may further include a connection address for data forwarding. The connection address is mainly used by the first SgNB-DU to backhaul, to the MgNB, a data packet that has not been acknowledged by the terminal or has not been sent by the terminal. The third connection establishment request is used to request the second SgNB-DU to establish a connection to the MgNB. In this embodiment, content of the third connection establishment request is the same as the content of the second connection establishment request in the foregoing embodiments, and details are not described herein again.

S54: The first SgNB-DU sends a connection release acknowledgment message to the SgNB-CU.

S55: The second SgNB-DU sends a connection establishment acknowledgment message to the SgNB-CU.

There is no order of S54 and S55.

In addition, it should be noted that, in an actual application, a decision maker that modifies the connection may be the SgNB, and a specific execution method is similar to the execution method in the scenario shown in FIG. 10. Details are not described herein again.

This embodiment provides a solution in which the MgNB decides to change an existing connection, and based on the solution, establishment and changing of multi-connectivity can be more flexible. In addition, it can be ensured that the MgNB establishes a connection always to a DU function entity that is in a relatively desirable cell and has relatively desirable load. In this way, communication quality in the multi-connectivity is well guaranteed.

Herein, it should be noted that the technical solutions in this application are described in the foregoing embodiments from a perspective of DRB splitting only. However, in an actual application, the technical solutions in this application may be further used for splitting a signaling radio bearer (signaling radio bearer, SRB for short). Their execution processes and beneficial effects are similar, and details are not described herein again.

Figure 11:
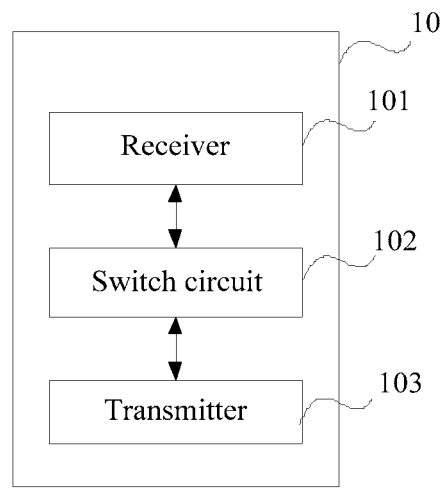
FIG. 11 is a schematic structural diagram of a connection establishment apparatus 10 according to an embodiment of this application.

FIG. 11 is a schematic structural diagram of a connection establishment apparatus 10 according to an embodiment of this application. The apparatus may be specifically a CU function entity in a secondary base station. As shown in FIG. 11, the apparatus includes: a receiver 101, a switch circuit 102, and a transmitter 103. In an actual application, the switch circuit 102 may be specifically a physical device having a switch circuit, such as a switcher or a switch board. The receiver 101 is configured to receive a first connection establishment request of a master device, where the first connection establishment request includes at least first identification information of a terminal, identification information of a first data radio bearer DRB, identification information of a target cell, and interface information of the master device. The switch circuit 102 is configured to send a second connection establishment request to a distributed unit DU function entity, where the second connection establishment request includes at least second identification information of the terminal, the identification information of the first DRB, and the interface information of the master device, and the DU function entity is associated with the target cell. The switch circuit 102 is configured to receive a first response message of the DU function entity, where the first response message includes at least the identification information of the first DRB and interface information of the DU function entity. The transmitter 103 is configured to send a second response message to the master device, where the second response message includes at least the identification information of the first DRB and the interface information of the DU function entity. In this embodiment, the interface information of the master device includes at least an interface identifier and an interface transmission address of the master device.

In this embodiment, the interface information of the DU function entity includes at least an interface identifier and an interface transmission address of the DU function entity.

In this embodiment, the second connection establishment request may further include the identification information of the target cell.

In this embodiment, in the first connection establishment request, the identification information of the first DRB has a correspondence with the identification information of the target cell.

In this embodiment, the first connection establishment request includes identification information of a plurality of cells, and the target cell is one of the plurality of cells.

In this embodiment, the first connection establishment request includes measurement information of each of the plurality of cells, and measurement information of the target cell meets a preset condition.

In an optional design, the apparatus 10 may include a processor and a memory. The memory is configured to store program code for implementing the technical solution shown in FIG. 3 or FIG. 6, and the processor is configured to run the program code stored in the memory.

The apparatus shown in FIG. 11 can execute the technical solution in the scenario shown in FIG. 3 or FIG. 6, and their execution manners and beneficial effects are similar and are not described herein again.

Figure 12:
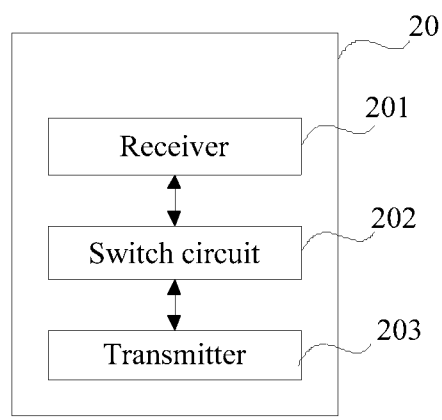
FIG. 12 is a schematic structural diagram of a connection establishment apparatus 20 according to an embodiment of this application.

FIG. 12 is a schematic structural diagram of a connection establishment apparatus 20 according to an embodiment of this application. In this embodiment, the apparatus may be specifically a CU function entity in a secondary base station. As shown in FIG. 12, the apparatus includes a receiver 201, a switch circuit 202, and a transmitter 203. In an actual application, the switch circuit 202 may be specifically a physical device having a switch circuit, such as a switcher or a switch board. The receiver 201 is configured to receive a first connection establishment request of a master device, where the first connection establishment request includes at least first identification information of a terminal, identification information of a first data radio bearer DRB, identification information of a target cell, and interface information of the master device. The transmitter 203 is configured to send a second response message to the master device, where the second response message includes at least the identification information of the first DRB and interface information of a distributed unit DU function entity, where the DU function entity is associated with the target cell. The switch circuit 202 is configured to send a second connection establishment request to the DU function entity, where the second connection establishment request includes at least the interface information of the DU function entity, second identification information of the terminal, the identification information of the first DRB, and the interface information of the master device. The switch circuit is configured to receive a first response message of the DU function entity, where the first response message includes at least the identification information of the first DRB and identification information that is used to indicate whether the DU function entity agrees to establish a connection.

In this embodiment, the interface information of the master device includes at least an interface identifier and an interface transmission address of the master device.

In this embodiment, the interface information of the DU function entity includes at least an interface identifier and an interface transmission address of the DU function entity.

In this embodiment, the second connection establishment request may further include the identification information of the target cell.

In this embodiment, in the first connection establishment request, the identification information of the first DRB has a correspondence with the identification information of the target cell.

In this embodiment, the first connection establishment request includes identification information of a plurality of cells, and the target cell is one of the plurality of cells.

In this embodiment, the first connection establishment request includes measurement information of each of the plurality of cells, and measurement information of the target cell meets a preset condition.

In an optional design, the apparatus 20 may include a processor and a memory. The memory is configured to store program code for implementing the technical solution shown in FIG. 8 or FIG. 9, and the processor is configured to run the program code stored in the memory.

The apparatus shown in FIG. 12 can execute the technical solution in the scenario shown in FIG. 8 or FIG. 9, and their execution manners and beneficial effects are similar and are not described herein again.

Figure 13:
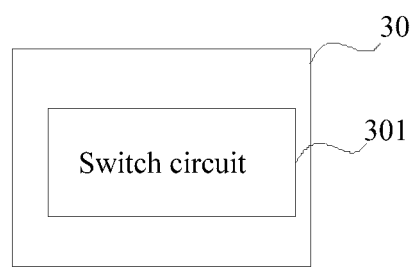
FIG. 13 is a schematic structural diagram of a connection establishment apparatus 30 according to an embodiment of this application.

FIG. 13 is a schematic structural diagram of a connection establishment apparatus 30 according to an embodiment of this application. In this embodiment, the apparatus may be specifically a DU function entity in a secondary base station. As shown in FIG. 12, the apparatus includes a switch circuit 301. In an actual application, the switch circuit may be specifically a physical device having a switch circuit, such as a switcher or a switch board. The switch circuit 301 is configured to receive a second connection establishment request sent by a CU function entity, where the second connection establishment request includes at least second identification information of a terminal, identification information of a first DRB, and interface information of a master device. The switch circuit is configured to send a first response message to the CU function entity, where the first response message includes at least the identification information of the first DRB and interface information of the DU function entity.

In this embodiment, the second connection establishment request may further include identification information of a target cell, and the target cell is associated with the DU function entity.

In an optional design, the apparatus 30 may include a processor and a memory. The memory is configured to store program code for implementing the technical solution shown in FIG. 3 or FIG. 6, and the processor is configured to run the program code stored in the memory.

The apparatus shown in FIG. 13 can execute the technical solution in the scenario shown in FIG. 3 or FIG. 6, and their execution manners and beneficial effects are similar and are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

Some of the foregoing software functions may be stored in a storage unit. The storage unit includes several instructions used to enable a computer device (which may be a personal computer, a server, a network device, or the like) or a processor (processor) to perform some of the steps of the methods described in the embodiments of this application. The storage unit includes one or more memories such as a read-only memory (Read-Only Memory, ROM), a random access memory (Random Access Memory, RAM), and an electrically erasable programmable read only memory (EEPROM). The storage unit may exist independently, or may be integrated with the processor.

It may be clearly understood by persons skilled in the art that, for the purpose of convenient and brief description, division of the foregoing functional modules is taken as an example for illustration. In an actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Persons of ordinary skill in the art may understand that various reference numerals such as "first" and "second" in this specification are for distinguishing only for ease of description, and are not used to limit a scope of the embodiments of this application.

Persons of ordinary skill in the art may understand that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A connection establishment method, comprising:
   receiving, by a central unit (CU) function entity, a first connection establishment request of a master device, wherein the first connection establishment request comprises at least first identification information of a terminal, identification information of a first data radio bearer (DRB), identification information of a target cell, and interface information of the master device;

sending, by the CU function entity, a second connection establishment request to a distributed unit (DU) function entity, wherein the second connection establishment request comprises at least second identification information of the terminal, the identification information of the first DRB, and the interface information of the master device, and wherein the DU function entity is associated with the target cell;

receiving, by the CU function entity, a first response message of the DU function entity, wherein the first response message comprises at least the identification information of the first DRB and interface information of the DU function entity; and sending, by the CU function entity, a second response message to the master device, wherein the second response message comprises at least the identification information of the first DRB and the interface information of the DU function entity.

2. The method according to claim 1, wherein the interface information of the master device comprises at least an interface identifier and an interface transmission address of the master device.

3. The method according to claim 2, wherein the interface information of the DU function entity comprises at least an interface identifier and an interface transmission address of the DU function entity.

4. The method according to claim 1, wherein the second connection establishment request comprises the identification information of the target cell.

5. The method according to claim 1, wherein in the first connection establishment request, the identification information of the first DRB has a correspondence with the identification information of the target cell.

6. The method according to claim 1, wherein the first connection establishment request comprises identification information of a plurality of cells, and wherein the target cell is one of the plurality of cells.

7. The method according to claim 6, wherein the first connection establishment request comprises measurement information of each cell of the plurality of cells, and wherein measurement information of the target cell meets a preset condition.

8. A connection establishment method, comprising:
receiving, by a central unit (CU) function entity, a first connection establishment request of a master device, wherein the first connection establishment request comprises at least first identification information of a terminal, identification information of a first data radio bearer (DRB), identification information of a target cell, and interface information of the master device;

sending, by the CU function entity, a second response message to the master device, wherein the second response message comprises at least the identification information of the first DRB and interface information of a distributed unit (DU) function entity, and wherein the DU function entity is associated with the target cell;

sending, by the CU function entity, a second connection establishment request to the DU function entity, wherein the second connection establishment request comprises at least the interface information of the DU function entity, second identification information of the terminal, the identification information of the first DRB, and the interface information of the master device; and receiving, by the CU function entity, a first response message of the DU function entity, wherein the first response message comprises at least the identification information of the first DRB and identification information that is used to indicate whether the DU function entity agrees to establish a connection.

9. The method according to claim 8, wherein the interface information of the master device comprises at least an interface identifier and an interface transmission address of the master device.

10. The method according to claim 9, wherein the interface information of the DU function entity comprises at least an interface identifier and an interface transmission address of the DU function entity.

11. The method according to claim 8, wherein the second connection establishment request comprises the identification information of the target cell.

12. The method according to claim 8, wherein in the first connection establishment request, the identification information of the first DRB has a correspondence with the identification information of the target cell.

13. The method according to claim 8, wherein the first connection establishment request comprises identification information of a plurality of cells, and wherein the target cell is one of the plurality of cells.

14. The method according to claim 13, wherein the first connection establishment request comprises measurement information of each cell of the plurality of cells, and wherein measurement information of the target cell meets a preset condition.

15. A connection establishment apparatus, comprising:
a receiver, a switch circuit, and a transmitter, wherein:
the receiver is configured to receive a first connection establishment request of a master device, wherein the first connection establishment request comprises at least first identification information of a terminal, identification information of a first data radio bearer (DRB), identification information of a target cell, and interface information of the master device;

the switch circuit is configured to send a second connection establishment request to a distributed unit (DU) function entity, wherein the second connection establishment request comprises at least second identification information of the terminal, the identification information of the first DRB, and the interface information of the master device, and wherein the DU function entity is associated with the target cell;

the switch circuit is configured to receive a first response message of the DU function entity, wherein the first response message comprises at least the identification information of the first DRB and interface information of the DU function entity; and the transmitter is configured to send a second response message to the master device, wherein the second response message comprises at least the identification information of the first DRB and the interface information of the DU function entity.

16. The apparatus according to claim 15, wherein the interface information of the master device comprises at least an interface identifier and an interface transmission address of the master device.

17. The apparatus according to claim 16, wherein the interface information of the DU function entity comprises at least an interface identifier and an interface transmission address of the DU function entity.

18. The apparatus according to claim 15, wherein the second connection establishment request comprises the identification information of the target cell.

19. The apparatus according to claim 15, wherein in the first connection establishment request, the identification information of the first DRB has a correspondence with the identification information of the target cell.

20. The apparatus according to claim 15, wherein the first connection establishment request comprises identification information of a plurality of cells, and wherein the target cell is one of the plurality of cells.

* * * * *